(No Model.)
W. YOUNG.
LATTICE HEDGE FENCE AND METHOD OF PLASHING.
No. 542,600. Patented July 9, 1895.
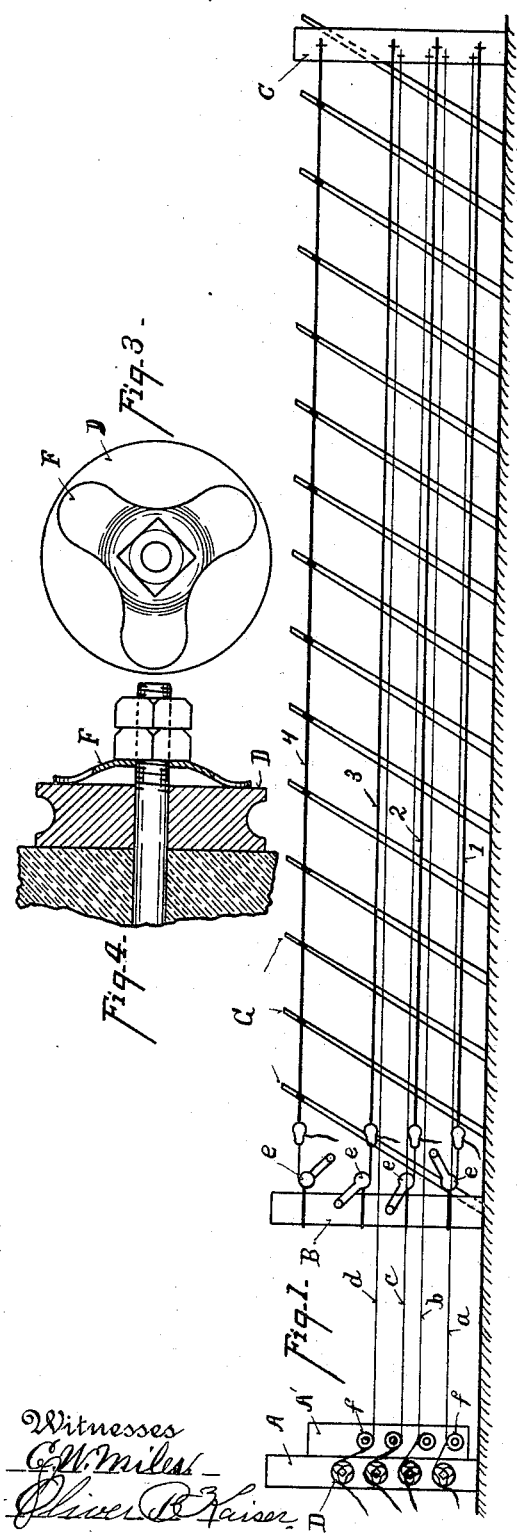
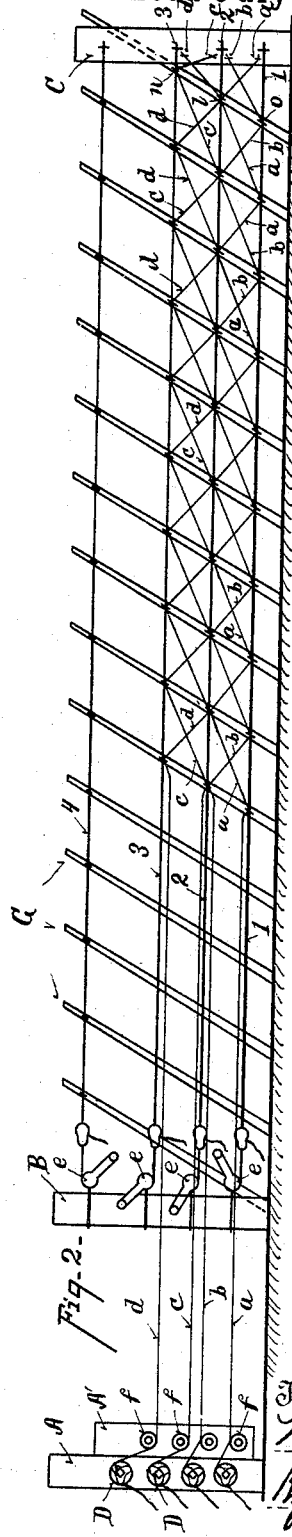
Witnesses
C. W. Miles
Oliver B. Kaiser
Inventor
W. Young
By Woods Boyd
Attorney

UNITED STATES PATENT OFFICE.

WESLEY YOUNG, OF DAYTON, OHIO.

LATTICE HEDGE FENCE AND METHOD OF PLASHING.

SPECIFICATION forming part of Letters Patent No. 542,600, dated July 9, 1895.

Application filed February 25, 1895. Serial No. 539,668. (No model.)

*To all whom it may concern:*

Be it known that I, WESLEY YOUNG, residing at Dayton, in the county of Montgomery and State of Ohio, have invented certain new and useful Improvements in Lattice Hedge Fences and Methods of Plashing, of which the following is a specification.

The object of my invention is to provide a hedge fence partly constructed of the growing plants and partly of lattice-wires, which are arranged through the spaces along the lower sections of the plants, and to hold the plants in an inclined position, so that the shoots will grow up and fill the spaces between the plants. The method of constructing the lattice-work connecting the plants is illustrated in the accompanying drawings, making a part of this specification, in which—

Figure 1 is a diagram in elevation illustrating the first step in the construction. Fig. 2 is a similar diagram illustrating the method of interlacing the wires and connecting them to the plants. Fig. 3 is a plan view of the face of a tension-spool. Fig. 4 is a vertical section of Fig. 3, showing the spool attached to the post.

A represents a post suitably anchored in the line of the fence.

D represents a series of tension-spools mounted thereon.

A' represents a secondary post attached to the post A and carrying a series of friction-rollers $f$.

B represents a post, also anchored in the line of the fence.

C represents the initial post, also anchored in the line of the fence.

G represents the plants, which are grown at suitable intervals along the line of the fence. When these plants attain a sufficient size for plashing, the posts or other equivalent means are placed in the line of the fence, and the horizontal wires 1 2 3 4 are attached to the anchoring-post C and drawn taut by means of the stretchers $e$. These horizontal wires maintain the plants in the proper inclination, and one or more of said wires may be attached to the plants in the initial step of plashing; but the plants may be attached to the wires simultaneously with the cross-lacing wires $a\ b\ c\ d$, which are laced to form the network.

This operation is as follows: This line of small wires $a\ b\ c\ d$ are each supported upon a friction-spool D and drawn forward and attached to the anchoring-post C, as shown in Fig. 1. Then the wires are connected to the plants in the following manner: The first plant is bent to the proper inclination, and the wire $b$ is drawn down and attached to the first plant by a staple $o$, which also secures wire 1 to the plant. Wire $a$ is drawn up and wire $d$ drawn down and they, together with the wire 2, are secured to the first plant by a staple $l$. Wire $c$ is drawn up and secured to the first plant by a staple $n$, which likewise embraces wire 3. Wire 4 is secured to the post by an independent staple. The next plant in the line is inclined, and the wires $a\ b\ c\ d$ are attached thereto by staples, also embracing the wires 1 2 3; but they are moved in reverse directions, forming a net or cross work of wires between the line of plants, and this method of plashing or lacing is continued along the line of the fence. The tension-spools supporting the wires $a\ b\ c\ d$ are regulated so that the wires will pay off at a slight strain, enabling the operator readily to draw them up or down and form the weaving or network.

There are several advantages obtained by this method of making a fence.

First. The network of wires effectually prevents the passage of both large and small animals between the growing plants.

Second. It forms a permanent substantial lattice-work.

Third. The lattice-wires help to hold the plants in their proper inclinations. The staples need not be driven clear up, leaving room for the growth of the plants, as the cross-wires assist the line-wires to hold the plants in position, and the plants are not liable to be injured in drawing the staples.

Fourth. In case any of the plants should not develop proper growth along the lower portion of the stems a permanent fence is still maintained without gaps or breaks.

I claim—

1. The method of constructing a lattice plashed hedge fence, which consists in stretching a series of horizontally extended main wires one above the other along a line of plants, then stringing a second series of small wires supported on tension spools so as to yield up and down, then drawing the said second series of wires alternately up and down between the horizontal wires in such manner as to form a lattice work and securing both series of wires to the plants at the meeting points of said wires, substantially as described.

2. The method of forming a combined hedge and lattice fence, which consists in inclining a series of plants adjacent to and parallel with a series of horizontally extended main wires arranged one above another, stretching another series of wires alternately up and down between the horizontally secured main wires, and fastening both series of wires to the inclined plants, at the meeting points of the two series of wires, substantially as described.

3. In a combined hedge and lattice fence, a series of horizontally supported main wires strung one above another, and a series of lattice-forming wires inclined alternately up and down and crossing each other between the main wires, in combination with a series of inclined plants to which both series of wires are secured, substantially as described.

In testimony whereof I have hereunto set my hand.

WESLEY YOUNG.

Witnesses:
ANDREW GILRUTH,
HOSMER P. HOLLAND.